(12) United States Patent
Saeki

(10) Patent No.: US 11,264,007 B2
(45) Date of Patent: Mar. 1, 2022

(54) TRANSLATION DEVICE, TRANSLATION METHOD, AND PROGRAM

(71) Applicant: Panasonic Intellectual Property Management Co., Ltd., Osaka (JP)

(72) Inventor: Natsuki Saeki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 203 days.

(21) Appl. No.: 16/726,306

(22) Filed: Dec. 24, 2019

(65) Prior Publication Data

US 2020/0143793 A1 May 7, 2020

Related U.S. Application Data

(63) Continuation of application No. PCT/JP2018/003367, filed on Feb. 1, 2018.

(30) Foreign Application Priority Data

Jul. 20, 2017 (JP) .............................. JP2017-141130

(51) Int. Cl.
 *G06F 16/33* (2019.01)
 *G10L 13/08* (2013.01)
 (Continued)

(52) U.S. Cl.
 CPC ........ *G10L 13/086* (2013.01); *G06F 16/3334* (2019.01); *G10L 15/005* (2013.01); *G10L 15/26* (2013.01)

(58) Field of Classification Search
 CPC ....... G10L 13/086; G10L 13/08; G10L 15/08; G10L 15/26; G10L 15/005; G10L 15/00;
 (Continued)

(56) References Cited

U.S. PATENT DOCUMENTS

| 6,154,720 A | 11/2000 | Onishi et al. |
| 6,356,865 B1* | 3/2002 | Franz ...................... G10L 15/26 |
| | | 704/2 |

(Continued)

FOREIGN PATENT DOCUMENTS

| EP | 751467 A2 | 1/1997 |
| JP | 8-272801 | 10/1996 |

(Continued)

OTHER PUBLICATIONS

Extended European Search Report dated Jun. 22, 2020 for the related European Patent Application No. 18835365.0.

(Continued)

*Primary Examiner* — Huyen X Vo
(74) *Attorney, Agent, or Firm* — McDermott Will & Emery LLP

(57) ABSTRACT

A translation device includes a speech recognition unit, a storage, a translation processor, and an information acquisition unit. The speech recognition unit recognizes a voice to generate a spoken sentence in a first language. The storage stores a plurality of example sentences each including a parameter representing a category corresponding to a plurality of terms. The translation processor searches the plurality of example sentences stored in the storage for an example sentence on the basis of the spoken sentence as a search result example sentence, and generates a converted sentence based on the search result example sentence. The information acquisition unit acquires specific information representing a specific term which corresponds to a specific parameter. If the search result example sentence includes the specific parameter, the translation processor generates the converted sentence based on the specific term represented by the specific information.

9 Claims, 11 Drawing Sheets

(51) Int. Cl.
*G10L 15/00* (2013.01)
*G10L 15/26* (2006.01)

(58) Field of Classification Search
CPC .... G06F 16/3334; G06F 16/33; G06F 40/129; G06F 40/232; G06F 40/53; G06F 40/284; G06F 40/186; G06F 40/47; G06F 40/40
See application file for complete search history.

(56) References Cited

U.S. PATENT DOCUMENTS

| | | | |
|---|---|---|---|
| 7,403,888 | B1 | 7/2008 | Wang et al. |
| 2005/0060138 | A1 | 3/2005 | Wang et al. |
| 2005/0131673 | A1* | 6/2005 | Koizumi ................. G10L 15/10 704/2 |
| 2005/0283365 | A1* | 12/2005 | Mizutani ................. G10L 15/22 704/257 |
| 2008/0077391 | A1 | 3/2008 | Chino et al. |
| 2009/0182549 | A1* | 7/2009 | Anisimovich .......... G06F 40/55 704/4 |
| 2013/0120163 | A1* | 5/2013 | Kollakowski .......... B64D 11/00 340/945 |
| 2014/0303960 | A1* | 10/2014 | Orsini ..................... H04L 51/04 704/2 |
| 2017/0185587 | A1* | 6/2017 | Mochida ................. G10L 13/00 |
| 2018/0095949 | A1* | 4/2018 | Lewis ................... G06F 16/248 |

FOREIGN PATENT DOCUMENTS

| | | |
|---|---|---|
| JP | 10-326277 | 12/1998 |
| JP | 2007-004473 | 1/2007 |
| JP | 4393494 B | 1/2010 |
| JP | 2010-266965 | 11/2010 |
| JP | 2011-060308 | 3/2011 |
| JP | 2014-145842 | 8/2014 |

OTHER PUBLICATIONS

International Search Report of PCT application No. PCT/JP2018/003367 dated May 1, 2018.

* cited by examiner

FIG. 2

| No. | Japanese (example sentence) | English (corresponding translation sentence) |
|---|---|---|
| 1 | {%airports!%} yuki, {%flight_num%} bin ni noritsugi no okyakusama wa chijo kakariin ni oshirase kudasai. | Passengers connecting to flight {%flight_num%} for {%airports!%},please contact the ground staff upon arrival. |
| 2 | Minasama, kono hikoki wa, ABC koku {%airports!:dest%} yuki desu. | Ladies and gentlemen.Welcome on board ABC air line for {%airports!:dest%}. |
| 3 | Kyubyo no okyakusama ga irasshaimasu node {%airports!:irreg%} ni hikikaesu koto ni narimashita. | The Captain has decided to return to {%airports!:irreg%} due to an ill passenger on board. |
| ... | | |

(Parameter determination information)
airports!:dest... <u>Haneda kuko</u> — A2

⇒ Table update

| Category name | Search word (regular expression) | Corresponding translation |
|---|---|---|
| airports! | (Haneda\|Tokyo)(Kokusai)?kuko | Tokyo International Airport |
| airports! | (Kansai)(Kokusai)?kuko | Kansai International Airport |
| airports! | (Osaka\|Itami)(Kokusai)?kuko | Osaka International Airport |
| flight_num | ([0-9]{1,20}(?=bin)) | [0-9]{1,20} |
| airports!:dest | ___ (Not used for search) | Tokyo International Airport |

21b

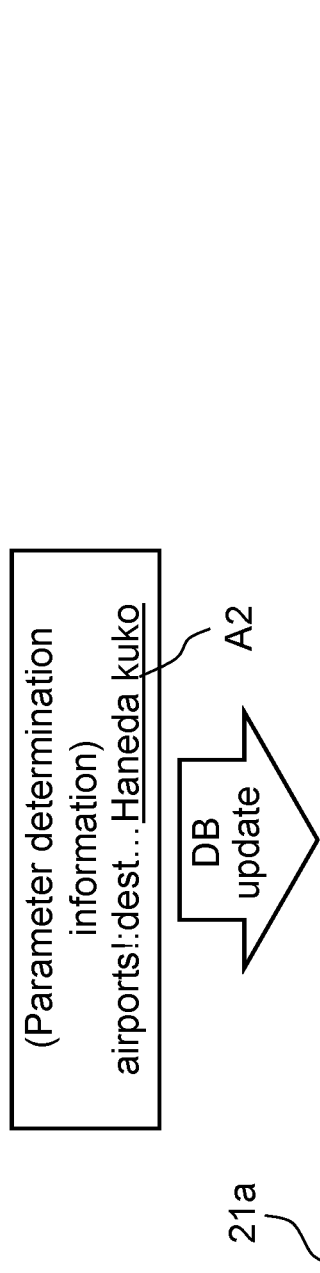

TRANSLATION DEVICE, TRANSLATION METHOD, AND PROGRAM

TECHNICAL FIELD

The present disclosure relates to a translation device, a translation method, and a program that perform machine translation.

BACKGROUND ART

PTL 1 discloses a machine translation device. The machine translation device of PTL 1 stores example sentences in a source language and example sentences in an object language that are translations of the example sentences in the source language, in correspondence to each other. The machine translation device performs translation by speech-recognizing a voice speech, calculating similarity between a speech recognition result and example sentences, and using an example sentence whose similarity is higher than or equal to a threshold.

PTL 2 discloses a speech analysis method for appropriately understanding a speech of a user even if a speech recognition result includes an unclear word due to the user's misreading or other causes. The speech analysis method of PTL 2 estimates an unclear word not in line with an intention of the user's speech, from a recognition result of speech recognition of voice data representing the user's speech, according to previously determined rules. In the speech analysis method, a right word in line with the user's intention is inferred on the basis of the similarity between the unclear word and the misread word.

CITATION LIST

Patent Literature

PTL 1: Japanese Patent No. 4393494
PTL 2: Unexamined Japanese Patent Publication No. 2014-145842

SUMMARY

An object of the present disclosure is to provide a translation device and a translation method that can improve accuracy of machine translation based on speech recognition of a speech.

A translation device according to the present disclosure includes a speech recognition unit, a storage, a translation processor, and an information acquisition unit. The speech recognition unit recognizes a voice to generate a spoken sentence in a first language. The storage stores a plurality of example sentences each including a parameter representing a category corresponding to a plurality of terms. The translation processor searches the plurality of example sentences stored in the storage for an example sentence on the basis of the spoken sentence as a search result example sentence, and generates a converted sentence based on the search result example sentence. The information acquisition unit acquires specific information representing a specific term which corresponds to a specific parameter. If the search result example sentence includes the specific parameter, the translation processor generates the converted sentence based on the specific term represented by the specific information.

A translation method according to the present disclosure is a translation method performed by a translation device. A storage of the translation device stores a plurality of example sentences each including a parameter representing a category corresponding to a plurality of terms. The translation method includes: a step of acquiring specific information representing a specific term which corresponds to a specific parameter; a step of generating a spoken sentence in a first language by recognizing a voice; and a step of searching the plurality of example sentences stored in the storage for an example sentence based on the spoken sentence as a search result example sentence to generate a converted sentence, based on the search result example sentence. In the step of generating the converted sentence, if the search result example sentence includes the specific parameter, the converted sentence is generated based on the specific term represented by the specific information.

If specific information corresponding to a parameter in an example sentence corresponding to a spoken sentence is obtained, the translation device and the translation method according to the present disclosure generate a translated sentence on the basis of a specific term. This can improve accuracy of machine translation based on speech recognition of a speech.

BRIEF DESCRIPTION OF DRAWINGS

FIG. 2 is a diagram for describing an example sentence data base in the translation system.

FIG. 7 is a diagram for describing an information update process in the translation system.

FIG. 11 is a diagram for describing a modified example of the information update process.

DESCRIPTION OF EMBODIMENT

Hereinafter, an exemplary embodiment will be described in detail appropriately with reference to the drawings. However, an unnecessarily detailed description will be omitted in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the applicant provides the attached drawings and the following description to help those skilled in the art to sufficiently understand the present disclosure, and the applicant does not intend to use the drawings or the description to limit the subject matter of the claims.

First Exemplary Embodiment

In a first exemplary embodiment, an application example will be described in which a translation device according to the present disclosure is applied to a translation system that translates an announcement made to passengers in an aircraft.

1. Configuration

Figure 1:
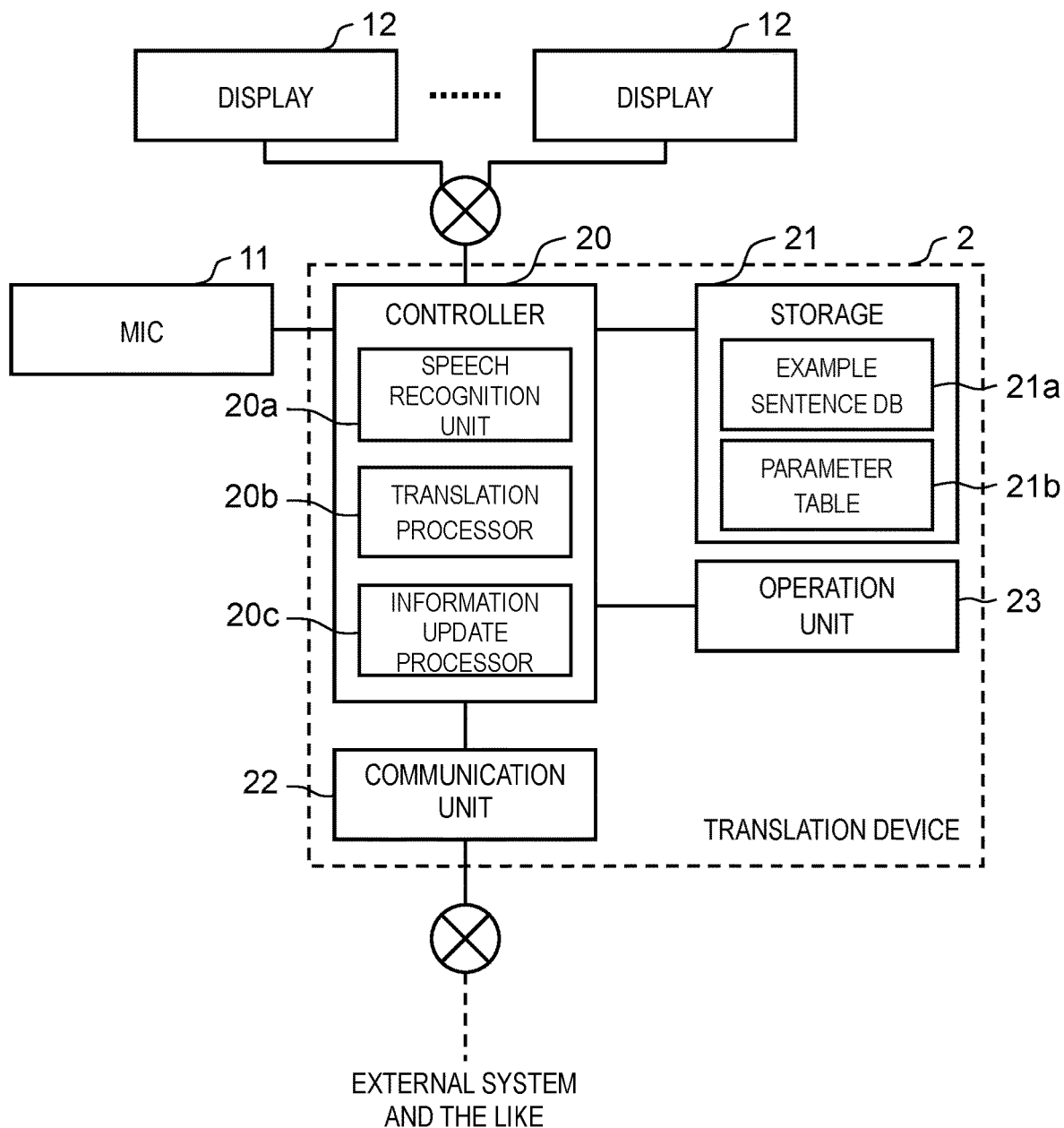
FIG. 1 is a block diagram showing a configuration of a translation system according to a first exemplary embodiment.

Configurations of the translation system and the translation device according to the first exemplary embodiment will be described with reference to FIG. 1. FIG. 1 is a block diagram showing a configuration of translation system 1 according to the present exemplary embodiment.

As shown in FIG. 1, translation system 1 of the present exemplary embodiment includes a microphone (hereinafter, abbreviated as "mic") 11, a plurality of display devices 12, and translation device 2. Translation system 1 is installed, for example, inside an aircraft. In translation system 1, when, for example, a cabin crew makes various cabin announcements by using mic 11, translation device 2 performs machine translation of the cabin announcements. Display devices 12 each display a translated sentence translated by machine translation at a passenger's seat or the like.

Mic 11 is used by users such as cabin crews. Mic 11 collects voices including a speech by a user to generate voice data of the collected voice. Translation system 1 may further include a speaker (not shown). The speaker outputs voice of the voice data generated by mic 11, in the aircraft.

Display devices 12 are each provided on a passenger's seat, for example. Each display device 12 includes a monitor such as a liquid crystal display or an organic electro luminescence (EL) display, a controller such as a central processing unit (CPU), a communication interface (I/F), an operation I/F, and the like. Display device 12 displays, on a monitor, various types of information such as a translated sentence, under control of the controller.

In the present exemplary embodiment, display devices 12 are connected to translation device 2 via a communication network such as a wired or wireless local area network (LAN). A user such as a passenger can operate display device 12 via the operation I/F and can set, for example, a language of the translated sentence to be displayed.

Translation device 2 is a computer that performs machine translation on a spoken sentence obtained by speech recognition of the voice data from mic 11 by using previously set example sentences. The example sentences are standard sentences supposed to be frequently used in, for example, cabin announcements and the like. Translation device 2 includes, as shown in FIG. 1, controller 20, storage 21, communication unit 22, and operation unit 23.

Controller 20 controls an overall operation of translation device 2. Controller 20 includes a CPU and the like to achieve a predetermined function in cooperation with, for example, software. Controller 20 reads out data and a program stored in storage 21 to perform various types of arithmetic processing, thereby achieving various functions. Controller 20 includes a communication I/F to transmit and receive data to and from mic 11 and each of display devices 12, and may control various operations of translation system 1.

For example, controller 20 functions as speech recognition unit 20a, translation processor 20b, and information update processor 20c. Speech recognition unit 20a performs speech recognition on the basis of the voice data that is output from mic 11. Translation processor 20b performs a translation process from a first language to a second language on the basis of a recognition result of speech recognition unit 20a. As the first language and the second language, various languages can be used. Information update processor 20c performs an information update process to update information to be used for the translation process. The various processes will be described later in detail.

Note that controller 20 may be a hardware circuit such as a dedicated electronic circuit designed to achieve a predetermined function or a reconfigurable electronic circuit. Controller 20 may be configured with various semiconductor integrated circuits such as a CPU, a micro processor unit (MPU), a graphics processing unit (GPU), a general-purpose graphics processing unit (GPGPU), a tensor processing unit (TPU), a microcomputer, a digital signal processor (DSP), a field programmable gate array (FPGA), and an application specific integrated circuit (ASIC). Alternatively, it is possible to use different hardware resources each of which functions as each of speech recognition unit 20a, translation processor 20b, and information update processor 20c.

Storage 21 is a storage medium that stores a program and data required to achieve the function of translation device 2. Storage 21 is configured with, for example, a hard disk (HDD) or a semiconductor storage device (SSD). The above program may be provided through various communication networks or may be stored in a portable recording medium.

For example, storage 21 stores information representing languages set on display devices 12, example sentence data base 21a, and parameter table 21b. Hereinafter, the term "data base" is abbreviated as "DB" in some cases. Example sentence DB 21a is a data base that manages the example sentences used in the translation process. The example sentences are standard sentences supposed to be frequently used. In an example sentence, a part that can be replaced by various terms is described as a parameter. Parameter table 21b is a data table that manages information about parameters in example sentences. Example sentence DB 21a and parameter table 21b will be described later.

Storage 21 may include, for example, a random access memory (RAM) such as a dynamic random-access memory (DRAM) or a static random access memory (SRAM) or may function to temporarily store data or function as a work area for controller 20. Further, storage 21 may include a read only memory (ROM) that stores, for example, a program executed by controller 20, a fixed parameter, and the like.

Communication unit 22 is an I/F circuit that connects communication with a system or the like outside translation system 1 via a communication network. The external system is a system of an aircraft that handles flight information including, for example, a flight number, a departure, and a destination. Communication unit 22 is an example of an information acquisition unit in the present exemplary embodiment.

Operation unit 23 is an input device that receives input of an operation of a user. Operation unit 23 is configured with, for example, a keyboard, a touch pad, a touch panel, a button, a switch, and a combination of these devices. Operation unit 23 may include various input devices that can be operated by a pilot in a cockpit in an aircraft. Operation unit 23 is an example of the information acquisition unit in the present exemplary embodiment.

1-1. Data Base

Figure 3:
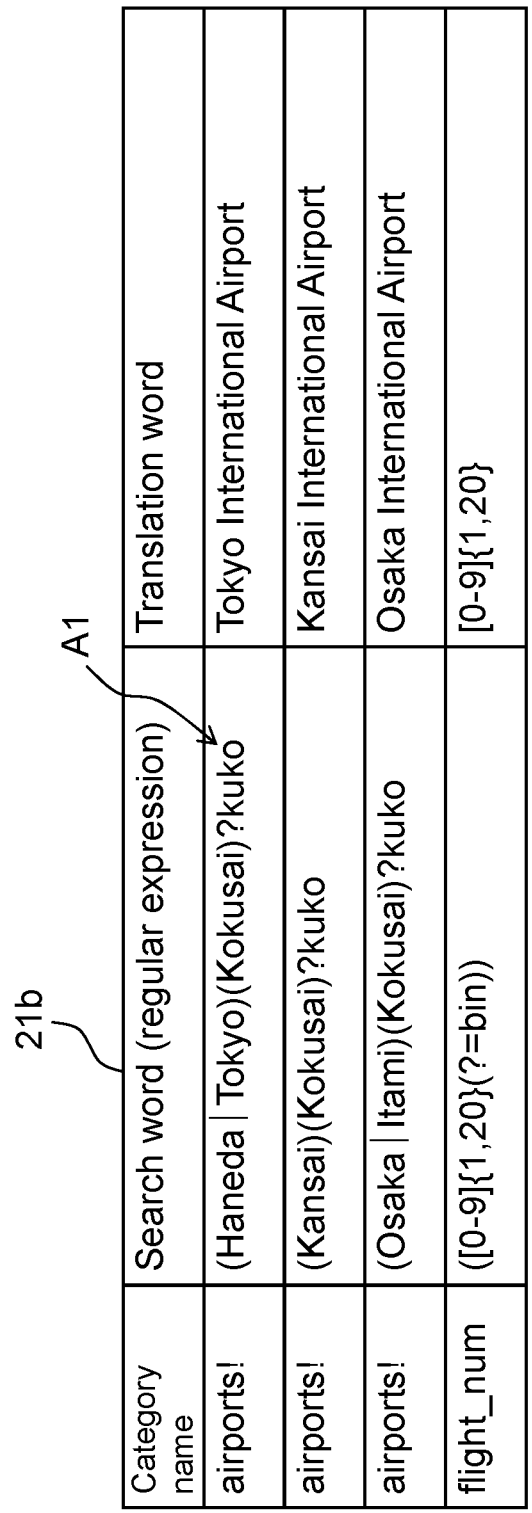
FIG. 3 is a diagram for describing a parameter table in the translation system.

In the present exemplary embodiment, a description will be made on example sentence DB 21a and parameter table 21b stored in storage 21 of translation device 2, with reference to FIGS. 2, 3, and 4. FIG. 2 is a diagram for describing example sentence DB 21a. FIG. 3 is a diagram for describing parameter table 21b.

FIG. 2 exemplifies example sentence DB 21a storing a plurality of example sentences supposed to be used for cabin announcements in an aircraft. Example sentence DB 21a exemplified in FIG. 2 records identification numbers "No."

of example sentences and example sentences in "Japanese" and "English", which are corresponding translations of each other, in association with each other. Example sentence DB 21a may further associate example sentences in various languages such as Chinese and Korean with each other. Hereinafter, a description will be made on a case where the first language of the translation source and the second language of the translation destination in translation device 2 are respectively Japanese and English. In this case, an "English" example sentence in example sentence DB 21a is a corresponding translation sentence of the "Japanese" example sentence associated with the "English" example sentence.

The "No. 1" example sentence in example sentence DB 21a includes a parameter {% airports!%} and a parameter {% flight_num %}. The symbol "{%" represents a start end of a parameter part in the example sentence, and the symbol "%}" represents a finish end of the parameter part. Each parameter represents a category corresponding to a plurality of replaceable terms. For example, the parameter "{% airports!%}" represents the category "airports!" that can be replaced by various airport names. Further, the parameter "{% flight_num %}" represents the category "flight_num" that can be replaced by various flight numbers. Information about various parameters is managed by parameter table 21b. Note that the symbol "!" represents weighting of a parameter depending on the category.

Parameter table 21b exemplified in FIG. 3 records "Category name", "Search word", and "Translation word" in association with each other. The "Category name" represents names of categories of the above-described parameters. The "Search word" represents a word for searching for the term corresponding to the parameter, in the sentence in the first language of the translation source. The "Translation word" represents a term of the corresponding translation that is in the second language of the translation destination and corresponds to the term corresponding to the "Search word".

In the example of FIG. 3, the "Search word" is set in Japanese. The "Search word" is written in a regular expression with which it is possible to search terms that have a plurality of expressions in each category. For example, with search word A1 of FIG. 3, it is possible to collectively search the terms "Haneda kuko", "Tokyo kuko", "Haneda kokusai kuko", and "Tokyo kokusai kuko". The "Search word" in parameter table 21b may be set in various languages used as the first language of the translation source.

Further, in the example of FIG. 3, the "Translation word" is set in English; however, in the "Translation word" of parameter table 21b, a plurality of terms may be registered in various languages, corresponding to the second language used for the translation destination.

Figure 4:
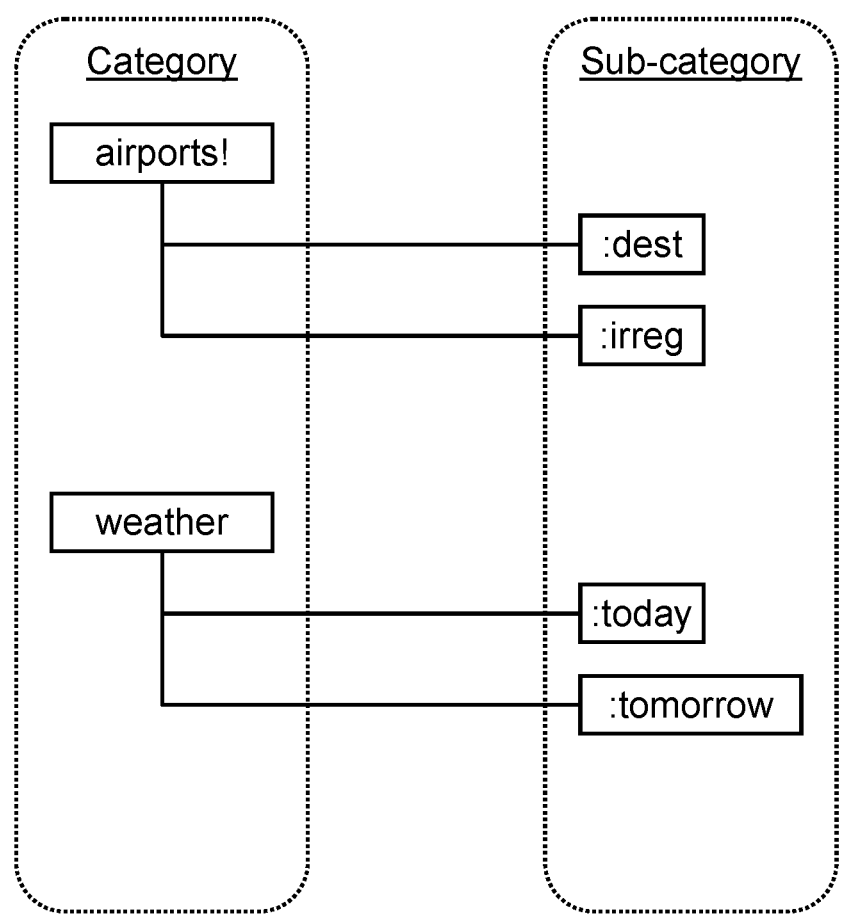
FIG. 4 is a diagram for describing sub-categories of parameters.

FIG. 4 is a diagram for describing sub-categories of parameters. In the present exemplary embodiment, a sub-category is used that segmentizes the above category of parameter. For example, as shown in FIG. 4, the category "airports!" includes two sub-categories "airports!:dest" and "airports!:irreg". Specification of the sub-category starts at the symbol ":".

The sub-category "airports!:dest" represents a destination airport. The sub-category "airports!:irreg" represents an airport for emergency landing. The above sub-categories segmentize "airport" into "original destination airport" and "airport for emergency landing". Each sub-category parameter is included in each of the example sentences "No. 2" and "No. 3" in example sentence DB 21a of FIG. 2. The category "airports!" may include more sub-categories, for example, a departure airport. Further, like the example sentence of "No. 1" in example sentence DB 21a, it is possible to use the parameter {% airports!%} in which no particular sub-category is specified.

The sub-category may segmentize not only the category "airports!", which is an airport name, but also in various categories. As an example, in the example of FIG. 4, the category "weather" representing the weather is segmentized into the sub-category "weather:today" representing the weather today and into the sub-category "weather:tomorrow" representing the weather tomorrow. In the present exemplary embodiment, as described above, by configuring the parameter in example sentence DB 21a with sub-categories, it is possible to improve the accuracy of translation by translation device 2 on the basis of information acquired for each sub-category.

2. Operation

Hereinafter, a description will be made on an operation of translation system 1 and translation device 2 configured as described above.

2-1. Overall Operation

Figure 5:
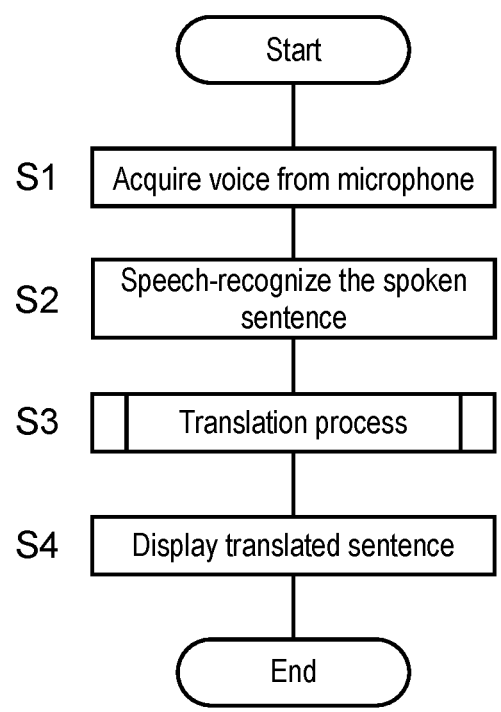
FIG. 5 is a flowchart for describing an operation of the translation system.
Figure 6:
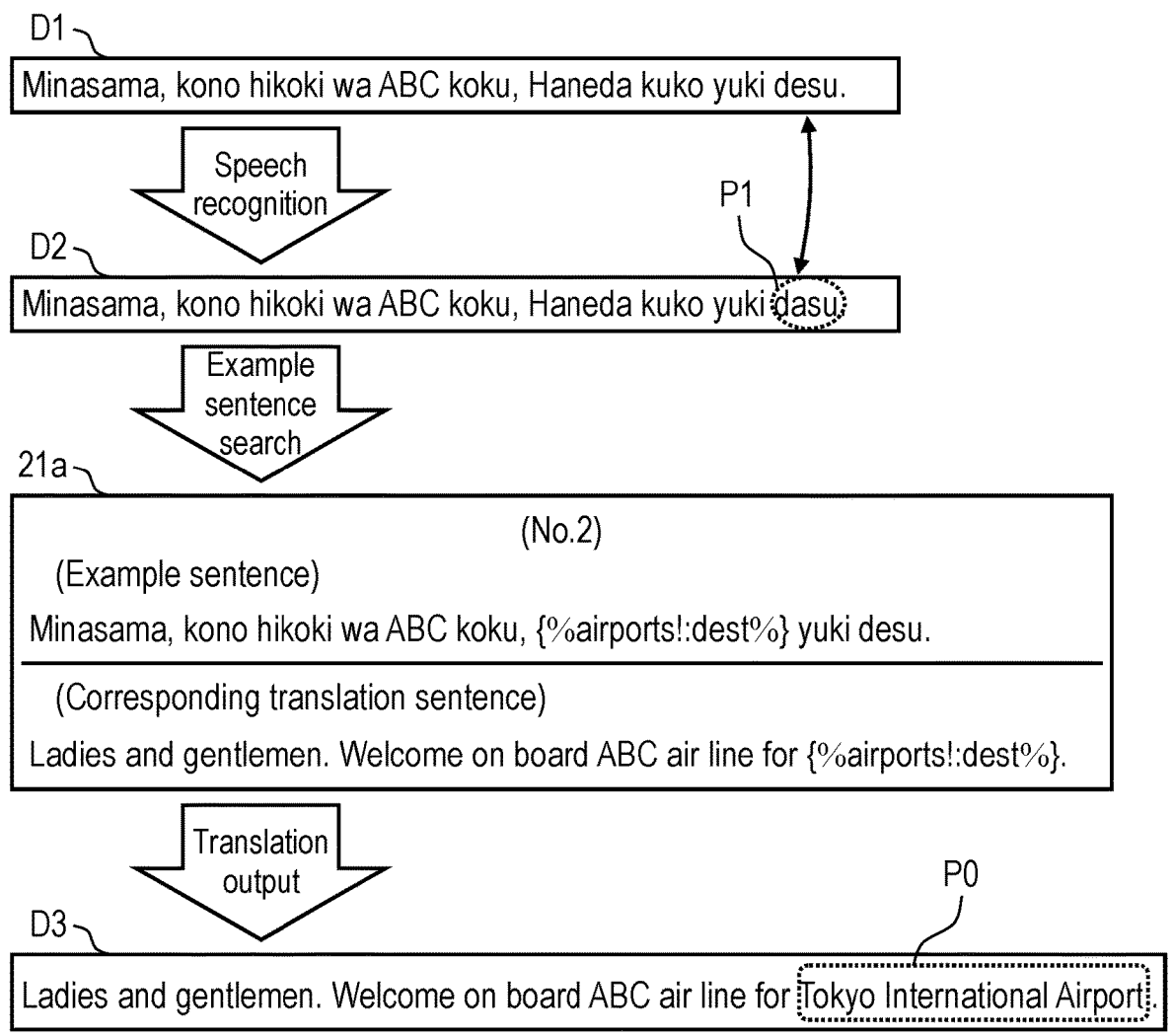
FIG. 6 is a diagram for describing the operation of the translation system.

An overall operation of translation system 1 will be described with reference to FIGS. 5 and 6. FIG. 5 is a flowchart for describing an operation of translation system 1. FIG. 6 is a diagram for describing the operation of translation system 1.

The flowchart of FIG. 5 is started when mic 11 generates voice data in translation system 1 of FIG. 1. The processes of this flowchart are performed by controller 20 of translation device 2.

First, controller 20 of translation device 2 acquires voice data from mic 11 (step S1). The example of FIG. 6 shows voice data D1 acquired when a speech "Minasama, kono hikoki wa ABC koku haneda kuko yuki desu" is made into mic 11.

Next, controller 20 performs speech recognition on the spoken sentence on the basis of acquired voice data D1 (step S2). Specifically, controller 20 functions as speech recognition unit 20a and performs a speech recognition process on voice data D1 in the previously set first language. Speech recognition unit 20a generates speech-recognized spoken sentence D2 as text data.

Next, controller 20 performs a translation process from the first language to the second language on the basis of speech-recognized spoken sentence D2 (step S3). FIG. 6 shows an example where the first language is Japanese and the second language is English.

The translation process of step S3 is performed by controller 20, as translation processor 20b, searching for an example sentence similar to speech-recognized spoken sentence D2 in example sentence DB 21a. In this process, the parameter in the corresponding translation sentence corresponding to the search result example sentence is restored to an appropriate translation word as shown by restored part P0, so that translated sentence D3 in text data is generated. By the above translation process, if corresponding translation sentences are stored in a plurality of languages in example sentence DB 21a, translation can be done into various second languages. The translation process of step S3 will be described later in detail. Translated sentence D3 is an example of a converted sentence in the present exemplary embodiment.

Next, controller 20 transmits translated sentence D3 as a translation result to display devices 12 to display translated sentence D3 on display devices 12 (step S4). At this time, controller 20 delivers to each display device 12 the translation result in the previously set language. Further, controller 20 may highlight restored part P0 in the translated sentence on display devices 12. The highlighting can be done by various manners such as bold, underline, and marker.

Controller 20 transmits data of the translation result to display devices 12 (step S4) and finishes the processes of this flowchart.

By the above processes, for example, when a cabin announcement is being made, the passengers of the aircraft can check the translation result in desired languages on individual display devices 12.

Further, by the above processes even when incorrect recognition occurs, for example, in the speech recognition in step S2, effect of the incorrect recognition can be reduced, and the machine translation in step S3 can be performed with accordingly high accuracy. For example, in the example of FIG. 6, the speech recognition result of step S2 includes incorrectly recognized part P1. However, by the translation process of step S3, even when incorrectly recognized part P1 is included at a part of spoken sentence D2, an example sentence similar to the speech-recognized spoken sentence D2 in the part other than incorrectly recognized part P1 is retrieved. Then, appropriate translated sentence D3 corresponding to the retrieved example sentence is generated.

In the above process, by using a parameter corresponding to a category, it is possible to perform the process by using a common example sentence with respect to spoken sentences including different terms in the same category. Note that terms corresponding to such a parameter as described above are previously determined in some cases. For example, in the case of cabin announcements in an aircraft, information such as a destination and a flight number is determined at a point of time before the aircraft is operated. Further, an airport for emergency landing is not yet determined before departure but is determined at the time of an emergency announcement.

In translation system 1 of the present exemplary embodiment, to improve translation accuracy by using previously determined information as described above, an information update function is introduced where a term to be associated with a parameter is determined for each sub-category in various categories. The information update process of the present exemplary embodiment that achieves the above information update function will be described below.

2-2. Information Update Process

The information update process of the present exemplary embodiment will be described with reference to FIGS. 7 and 8. FIG. 7 is a diagram for describing the information update process of the present exemplary embodiment.

FIG. 7 exemplifies the parameter determination information including the sub-category parameter "airports!:dest" and term A2 representing "Haneda kuko". The parameter determination information is an example of specific information indicating the fact that it has been determined that a specific term is put in correspondence to a specific parameter defined by a sub-category. Controller 20 acquires the parameter determination information via various information acquisition units such as communication unit 22 and operation unit 23.

In the information update process of the present exemplary embodiment, as shown in FIG. 7, when the parameter determination information is acquired in translation system 1, parameter table 21b in storage 21 of translation device 2 is updated. Hereinafter, a description will be made on the information update process that is performed when the term for the specific parameter is determined in the first language (Japanese) in the acquired parameter determination information.

Figure 8:
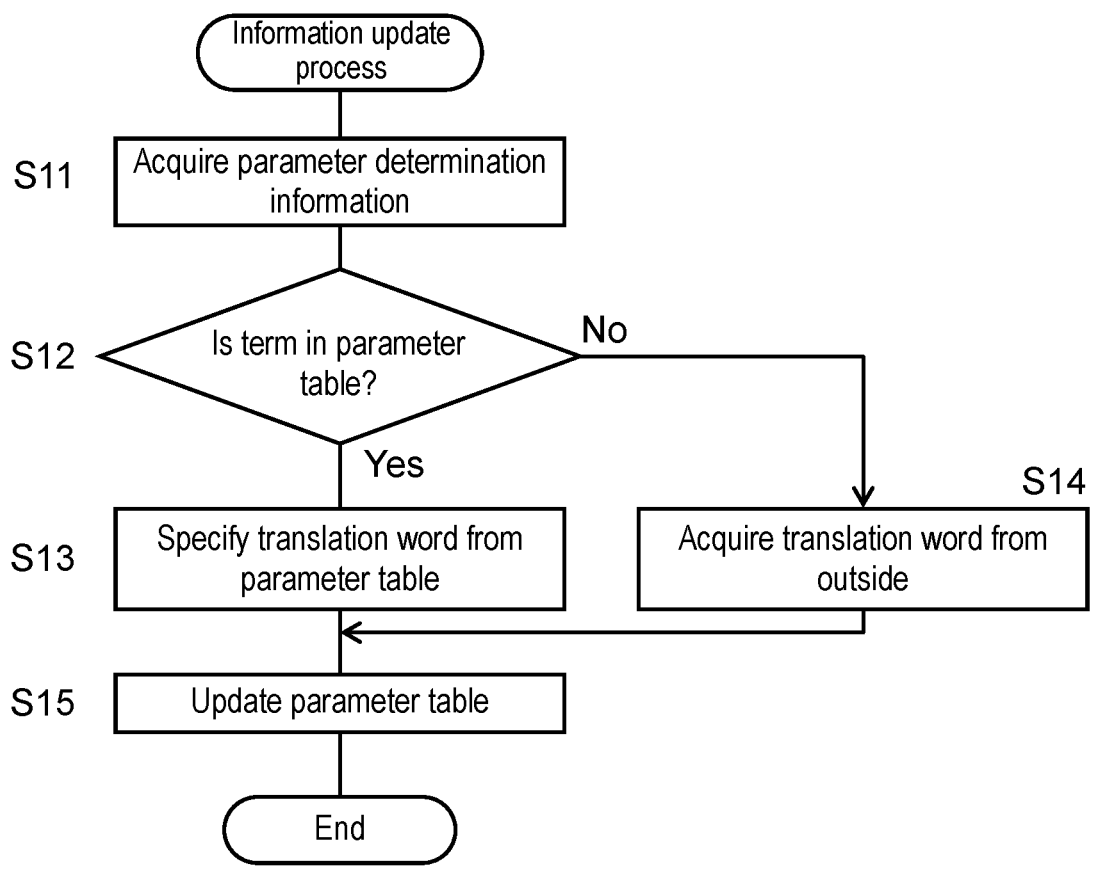
FIG. 8 is a flowchart for describing the information update process in the translation system.

FIG. 8 is a flowchart for describing the information update process of the present exemplary embodiment. The processes of the flowchart of FIG. 8 are performed by controller 20 of translation device 2 functioning as information update processor 20c.

First, controller 20 acquires parameter determination information via various information acquisition units (step S11). For example, from predetermined information such as flight information about an operation of an aircraft acquired from an external system of translation system 1 via communication unit 22, controller 20 retrieves information about the terms determined for various sub-categories at the time. Further, by input of a user on operation unit 23, controller 20 may acquire information about determined terms for various sub-categories.

Next, controller 20 determines whether the determined term in the parameter determination information is included in the search words in parameter table 21b (step S12). For example, if the determined term is term A2, term A2 matches the regular expression of the search word on the first row in the category "airports!" as shown in FIG. 7; therefore, controller 20 proceeds to "Yes" in step S12.

If controller 20 determines that the determined term is included in the search words in parameter table 21b (step S12: Yes), controller 20 refers to parameter table 21b and specifies the translation word of the determined term (step S13). For example, controller 20 specifies the translation word "Tokyo International Airport" that is associated with the regular expression of term A2 in parameter table 21b. If parameter table 21b stores the translation word in a plurality of languages, controller 20 can collectively specify the translation word in each language.

On the other hand, if controller 20 determines that the determined term is not included in the search words in parameter table 21b (step S12: No), controller 20 acquires the translation word of the determined term from outside via various information acquisition units instead of the search words in parameter table 21b (step S14).

Next, controller 20 updates parameter table 21b so as to store the sub-category parameter and the translation word to be put in correspondence to the determined term in the parameter determination information (step S15). In the example of FIG. 7, to put term A2 in the parameter determination information in correspondence to "airports!:dest", controller 20 registers the category name "airports!:dest" and the translation word "Tokyo International Airport" in parameter table 21b, in association with each other.

By the above processes, it is possible to manage, in parameter table 21b, an update state of the parameter determination information with respect to the sub-category parameter. As shown in FIG. 7, in the present exemplary embodiment the information that includes the sub-category "airports!:dest" and registered in parameter table 21b is not particularly used when words are searched, but is used as the information indicating parameter determination information.

As described above, when the translation process (step S3 of FIG. 5) is performed in the state where the parameter determination information is obtained, translation device 2 uses the stored translation word for the corresponding sub-category parameter, whereby translation accuracy is improved. The translation process of the present exemplary embodiment will be described below in detail.

2-3. Translation Process

Figure 9:
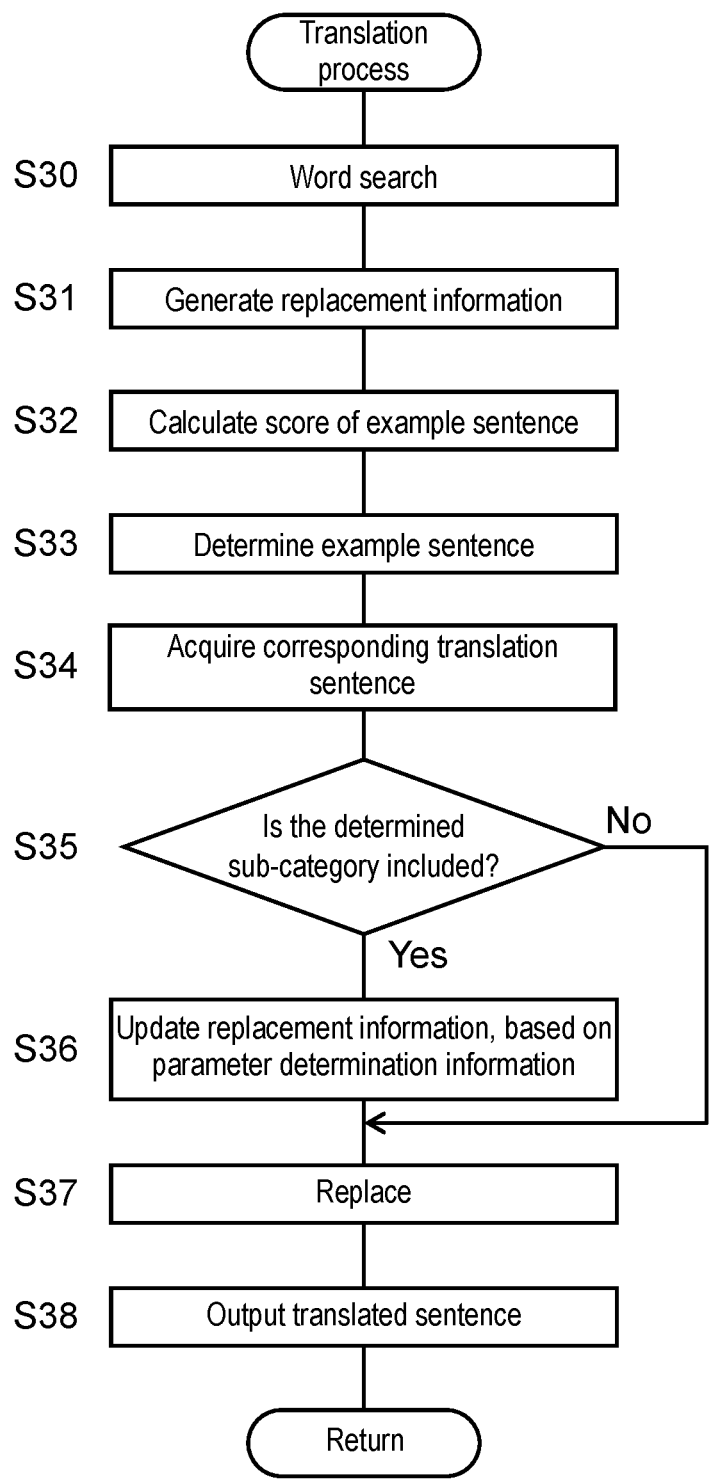
FIG. 9 is a flowchart for describing a translation process in the translation system.
Figure 10:
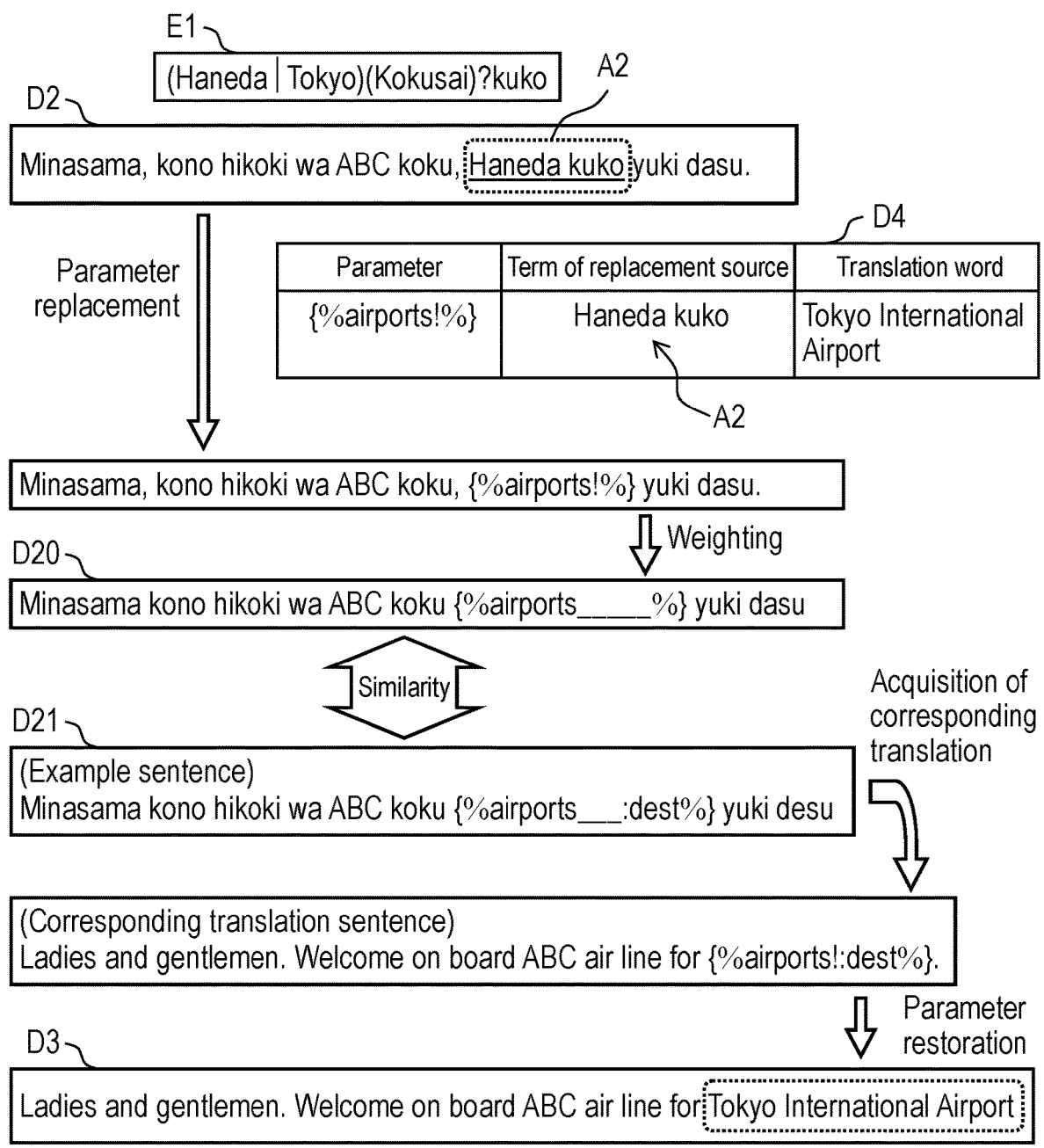
FIG. 10 is a diagram for describing the translation process in the translation system.

The translation process of step S3 of FIG. 5 will be described with reference to FIGS. 9 and 10. FIG. 9 is a flowchart for describing the translation process in translation system 1. FIG. 10 is a diagram for describing the translation process.

By controller 20 of translation device 2 functioning as translation processor 20b, each process of the flowchart shown in FIG. 9 is performed. This flowchart is started after step S2 of FIG. 5 is performed.

First, controller 20 refers to parameter table 21b and searches the speech-recognized spoken sentence for the words included in the categories represented by the parameters (step S30). For example, as shown in FIG. 10, controller 20 applies search formula E 1 to spoken sentence D2 of text data and thus identifies term A2. As shown in FIG. 3, search formula E 1 is associated with the category "airports!" in parameter table 21b, in form of a regular expression of a search word. Note that sub-categories are not particularly used when the word search in step S30 is performed (see FIG. 7).

Next, in the spoken sentence, controller 20 replaces the term, which is a word search result, with the parameter and generates replacement information representing a correspondence relationship between before and after the replacement (step S31). For example, controller 20 temporarily stores the generated replacement information in storage 21.

In the example of FIG. 10, controller 20 replaces, in spoken sentence D2, term A2 with the parameter {% airports!%} of the corresponding category. Further, based on the result of the word search, controller 20 acquires, from parameter table 21b, the translation word "Tokyo International Airport" associated with the regular expression of term A2. Controller 20 generates replacement information D4 while associating the parameter {% airports!%}, term A2 of the replacement source, and the translation word "Tokyo International Airport" with each other, as shown in FIG. 10.

Next, based on the spoken sentence after the parameter is replaced, controller 20 calculates a score of each example sentence for retrieving the example sentence similar to the spoken sentence from example sentence DB 21a of FIG. 2 (step S32). For example, controller 20 calculates a so-called edit distance (Levenshtein distance) between character string D20 of the spoken sentence as shown in FIG. 10 and character string D21 of the example sentence, thereby calculating the score. Further, it is possible to calculate a score of each example sentence by using a known method other than the edit distance and thus to evaluate the similarity with respect to the spoken sentence.

In the example of FIG. 10, to increase contribution of the weighting symbol "!" in the category to the evaluation of similarity in character strings D20 and D21, which are evaluation targets, the weighting symbol "!" is replaced by a plurality of (five, for example) predetermined characters "_". Further, characters such as punctuation marks are removed from character strings D20 and D21 not to contributed to the evaluation of similarity. Further, information in the sub-category such as ":dest" included in an example sentence in example sentence DB 21a also is not used for calculation of an edit distance so that the information does not contribute to the evaluation of similarity in the same way as punctuation marks and the like.

Next, based on the calculation result of the scores, controller 20 determines the search result example sentence in example sentence DB 21a (step S33). For example, controller 20 determines the example sentence having the highest score as the search result example sentence.

Next, controller 20 refers to example sentence DB 21a to acquire the corresponding translation sentence associated with the determined example sentence (step S34). The example of FIG. 10 is an example where the corresponding translation sentence acquired from example sentence DB 21a includes the sub-category parameter {% airports!:dest %}.

Next, controller 20 refers to, for example, parameter table 21b to determine whether the obtained corresponding translation sentence includes the sub-category parameter previously determined by parameter determination information (step S35). For example, as shown in FIG. 3, if a sub-category parameter is not particularly registered in parameter table 21b or if the registered sub-category parameter is not included in the corresponding translation sentence, controller 20 proceeds to "No" in step S35.

If it is determined that the corresponding translation sentence does not include the determined sub-category (step S35: No), controller 20 replaces, based on replacement information D4 stored at the time of the replacement in spoken sentence D2, the parameter in the corresponding translation sentence with the translation word in replacement information D4 (step S37). In this case, translated sentence D3 is generated in such a manner that the translation word corresponding to the parameter in the corresponding translation sentence is restored on the basis of the information of the replacement source of the parameter in spoken sentence D2.

On the other hand, if it is determined that the corresponding translation sentence includes the determined sub-category (step S35: Yes), controller 20 updates replacement information D4 on the basis of the parameter determination information registered in parameter table 21b, for example, as shown in FIG. 7 (step S36). Specifically, controller 20 overwrites the translation word in the replacement information D4 on the basis of the translation word registered in parameter table 21b.

In this case, controller 20 replaces the parameter in the corresponding translation sentence with the translation word on the basis of the updated replacement information (step S37). By this process, instead of the information of the replacement source in spoken sentence D2, the parameter {% airports!:dest %} is restored on the basis of the previously obtained parameter determination information, so that translated sentence D3 is generated.

Next, controller 20 outputs as translated sentence D3 the corresponding translation sentence in which the parameter is replaced by the translation word (step S38). Then, controller 20 finishes the process of step S3 of FIG. 5 and proceeds to the process of step S4.

By the above process, if the example sentence including the parameter corresponding to the case where the parameter determination information is previously obtained is determined as the search result (step S35: Yes), translated sentence D3 is generated in such a manner that the parameter in the corresponding translation sentence is restored with the translation word of the specific term represented by such information. By this process, even if, for example, a term that is the replacement source of a parameter in spoken sentence D2 is incorrect due to incorrect recognition in the speech recognition, an error in the speech, or other causes, the correct translation word previously obtained as the parameter determination information can be used for translation, so that the translation accuracy is improved.

For example, in a case where a search object spoken sentence in step S30 is "Minasama, kono hikoki wa ABC koku Itami kuko yuki desu", in which "Itami kuko" is erroneously used instead of the term "Haneda kuko" in the parameter determination information, the translation word obtained when the parameter is replaced (step S31) becomes "Osaka International Airport" (see FIG. 7). However, controller 20 updates the replacement information by using the parameter determination information (step S36), so that the translation word is restored to be "Tokyo International Airport", which is the translation word for "Haneda kuko" in the translated sentence.

Further, in a case where the search object spoken sentence in step S30 is "Minasama, Kono hikoki wa ABC koku aiueo yuki desu", in which the airport name erroneously becomes "aiueo", nothing is found in the word search, and the word "aiueo" is not replaced by a parameter. Therefore, the translation word for such part is not obtained at the time of step S31. However, controller 20 updates the replacement information by using the parameter determination information (step S36), so that the translation word is restored to be "Tokyo International Airport", which is the translation word for "Haneda kuko" in the translated sentence.

In the above translation process, the process of step S31 is appropriately omitted when no term is particularly found in the word search in step S30. Further, if a plurality of terms are found in one spoken sentence in step S30, controller 20 generates pieces of replacement information each of which is associated with each parameter.

Further, in the process of step S33, scores may be calculated for a part of the example sentences in example sentence DB 21a. For example, controller 20 may narrow down the calculation target example sentences by acquiring information about flight phases such as before or after takeoff of an aircraft or during boarding an aircraft. In this case, for example, the example sentences in example sentence DB 21a may be previously categorized depending on the flight phases.

Further, if no calculated score is greater than or equal to a predetermined threshold in the process of step S33, a translated sentence does not have to be output in step S34. This arrangement can prevent display device 12 from displaying a translated sentence having an extremely low translation accuracy.

3. Effects and the Like

As described above, translation device 2 according to the present exemplary embodiment includes speech recognition unit 20a, storage 21, translation processor 20b, and communication unit 22 and operation unit 23 that serve as an information acquisition unit. Speech recognition unit 20a recognizes a voice to generate spoken sentence D2 in a first language. Storage 21 stores example sentence DB 21a containing a plurality of example sentences each including a parameter representing a category corresponding to a plurality of terms. Translation processor 20b searches the plurality of example sentences stored in storage 21 for an example sentence on the basis of spoken sentence D2 as a search result example sentence, and generates translated sentence D3 in a second language as an example of a converted sentence based on the search result example sentence. Communication unit 22 or operation unit 23 acquires parameter determination information as specific information representing a specific term which corresponds to a specific parameter (FIGS. 7 and 8). If the search result example sentence includes a specific parameter (step S35: Yes), translation processor 20b generates translated sentence D3 on the basis of the specific term represented by the parameter determination information. If the search result example sentence does not include the specific parameter (step S35: No), translation processor 20b generates a translated sentence on the basis of a term in spoken sentence D2 corresponding to the parameter.

Translation device 2 described above generates translated sentence D3 on the basis of the determined term if parameter determination information is acquired. This can improve accuracy of machine translation based on speech recognition of a speech.

In the present exemplary embodiment, the above specific parameter is defined by a sub-category that segmentizes a category (see FIGS. 4 and 8). Since a term can be determined for each sub-category, it is possible to improve accuracy of translation using the determined term without interfering with other sub-categories.

Further, in the present exemplary embodiment, storage 21 stores in example sentence DB 21a a plurality of example sentences and a plurality of corresponding translation sentences in the second language each of which corresponds to a respective example sentence, in association with each other. Translation processor 20b generates a translated sentence by using the corresponding translation sentence associated with the search result example sentence (steps S33 to S37). Thus, a spoken sentence can be translated into various languages.

Further, in the present exemplary embodiment, if parameter determination information with respect to the parameter in the search result example sentence is not obtained (step S35: No), translation processor 20b replaces, in the corresponding translation sentence associated with the example sentence, the parameter with the translation word, in the second language, corresponding to the term in the spoken sentence. If the parameter determination information with respect to the parameter is obtained (step S35: No), translation processor 20b replaces the parameter with the translation word, in the second language, corresponding to the specific term. Thus, a translation word in a translated sentence is determined by using the parameter determination information so that translation accuracy can be improved.

Further, in the present exemplary embodiment, translation processor 20b searches spoken sentence D2 for a term corresponding to the parameter on the basis of a search formula corresponding to a term included in each category (step S30). By this process, it is possible to perform word search on spoken sentence D2 about a category represented by a parameter.

Further, in the present exemplary embodiment, translation processor 20b replaces the term retrieved in spoken sentence D2 with the corresponding parameter (step S31), and searches for an example sentence on the basis of the similarity between the spoken sentence including the parameter having replaced and each example sentence (step S32 and S33). By this process, it is possible to collectively search example sentences for terms in the same category.

Further, in the present exemplary embodiment, the plurality of example sentences in example sentence DB 21a include sentences used for announcements in aircrafts. Translation device 2 of the present exemplary embodiment can be applied to cabin announcements.

Further, a translation method according to present exemplary embodiment is a translation method performed by translation device 2. Storage 21 of translation device 2 stores a plurality of example sentences each including a parameter representing a category corresponding to a plurality of terms. The present method includes: step S11 of acquiring specific information representing a specific term which corresponds to a specific parameter; step S1 of generating a spoken sentence in a first language by recognizing a voice; and step S3 of searching a plurality of example sentences stored in storage 21 for an example sentence based on the spoken sentence as a search result example sentence to generate a converted sentence, based on the search result example sentence. In step S3 of generating a translated sentence, if the search result example sentence includes a specific parameter (step S35: Yes), the translated sentence is generated based on the specific term represented by the specific information. If the search result example sentence does not include the specific parameter (step S35: No), a translated sentence is generated on the basis of a term in the spoken sentence corresponding to the specific parameter, in step S3.

A program for making translation device 2 perform the above translation method may be provided. The above translation method and program can improve accuracy of machine translation based on speech recognition of a speech.

Other Exemplary Embodiments

In the above, the first exemplary embodiment has been described as an example of the techniques disclosed in the present application. However, the techniques in the present disclosure are not limited to the above exemplary embodiment and can also be applied to an exemplary embodiment in which modification, replacement, addition, removal, or the like is performed appropriately. Further, the components described in the above exemplary embodiment can be combined to configure a new exemplary embodiment. Therefore, other exemplary embodiments will be illustrated below.

In the above first exemplary embodiment, an example has been described in which parameter table 21b is updated in the information update process performed when the parameter determination information is obtained (see FIGS. 7 and 8). In the information update process, example sentence DB 21a may be updated. This modified example will be described with reference to FIG. 11.

FIG. 11 is a diagram for describing a modified example of the information update process. In the information update process of the present modified example, in step S15 of FIG. 8, controller 20 generates shadow copy C2 of the example sentence in example sentence DB 21a as shown in FIG. 11. The shadow copy of an example sentence is data where, in the example sentence (No. 2) including the parameter of the sub-category "airports!:dest" of the parameter determination information, determined term A2 is substituted into the parameter.

Shadow copy C2 of an example sentence is effective, for example, in a case where a spoken sentence includes such an error that replacement of parameter cannot function in a translation process similar to that in the first exemplary embodiment (FIG. 9), like "Minasama, Kono hikoki wa ABC koku aiueo yuki desu". That is, for such a spoken sentence, it is supposed that a score of either the example sentence "No. 2" having a parameter or shadow copy C2 of the example sentence is the highest. Therefore, whichever is retrieved as a search result, a translated sentence can be generated appropriately.

Further, in the above exemplary embodiments, when parameter determination information is obtained, nothing is particularly changed with respect to the word search in step S30 of FIG. 9. For example, search for a determined term may be prohibited when parameter determination information is obtained.

In the above exemplary embodiments, an application example has been described in which translation device 2 is applied to translation of cabin announcements in aircrafts. The present disclosure is not limited to the above application example and can be applied to, for example, machine translation using example sentences depending on each purpose of announcements in trains, orders in restaurants, serving customers, and the like.

Further, in the above exemplary embodiments, translation device 2 has been described that generates a translated sentence in the second language as an example of converted sentences. The converted sentence that is generated on the basis of the techniques of the present disclosure is not limited to a translated sentence and may be, for example, a sentence in the first language. For example, the translation device of the present disclosure may output as a converted sentence a sentence in which the parameter in an example sentence obtained as a search result of a spoken sentence is restored by a corresponding term in the spoken sentence or by the term in the first language obtained from parameter determination information. With this arrangement, it is possible to accurately correct (translate), for example, speech errors, honorific words, and dialectal words in spoken sentences.

The exemplary embodiments have been described above as examples of the techniques according to the present disclosure. For that purpose, the accompanying drawings and the detailed description have been provided.

Therefore, the components described in the accompanying drawings and the detailed description not only include the components necessary to solve the problem, but also can include components unnecessary to solve the problem in order to illustrate the above techniques. For this reason, it should not be immediately recognized that those unnecessary components are necessary just because those unnecessary components are described in the accompanying drawings and the detailed description.

In addition, because the above exemplary embodiments are for exemplifying the techniques in the present disclosure, various modifications, replacements, additions, removals, and the like can be made without departing from the scope of the accompanying claims or the equivalent thereof.

INDUSTRIAL APPLICABILITY

The present disclosure can be applied to a translation device, a translation method, and a program that performs machine translation using various example sentences.

REFERENCE MARKS IN THE DRAWINGS

1: translation system
2: translation device
20: controller
20a: speech recognition unit
20b: translation processor
20c: information update processor
21: storage
22: communication unit
23: operation unit

The invention claimed is:
1. A translation device comprising:
a speech recognition unit that recognizes a voice to generate a spoken sentence in a first language;
a storage that stores a plurality of example sentences each including a parameter representing a category corresponding to a plurality of terms;
a translation processor that searches the plurality of example sentences stored in the storage for an example sentence based on the spoken sentence as a search result example sentence, and generates a converted sentence, based on the search result example sentence; and an information acquisition unit that acquires specific information that corresponds to a specific parameter and represents a specific term related to a vehicle with a passenger on board or a shop where a guest is, from a system related to the vehicle or the shop, wherein when the search result example sentence includes the specific parameter, the translation processor generates the converted sentence based on the specific term represented by the specific information, the translation processor searches the spoken sentence, based on a search formula corresponding to the plurality of terms, and retrieves a term among the plurality of terms corresponding to the parameter, and when the search result example sentence does not include the specific parameter, the translation processor replaces the parameter in the search result example sentence with a translation word, in a second language, corresponding to the term retrieved in the spoken sentence.

2. The translation device according to claim 1, wherein the specific parameter is defined by a sub-category that segmentizes the category.

3. The translation device according to claim 1, wherein the storage stores the plurality of example sentences and a plurality of corresponding translation sentences in the second language each of which corresponds to a respective example sentence, in association with each other, and the translation processor generates as the converted sentence a translated sentence in the second language by using a corresponding translation sentence associated with the search result example sentence of the plurality of corresponding translation sentences.

4. The translation device according to claim 3, wherein when the search result example sentence includes the specific parameter, the translation processor replaces the specific parameter with a translation word, in the second language, corresponding to the specific term.

5. The translation device according to claim 1, wherein the translation processor generates a character string by replacing the term retrieved in the spoken sentence with the parameter, and the translation processor searches the plurality of example sentences, based on similarity between the character string including the parameter and each of the plurality of example sentences.

6. The translation device according to claim 1, wherein the vehicle is an aircraft or a train, and the plurality of example sentences include a sentence used for an announcement in the aircraft or the train.

7. The translation device according to claim 1, wherein the specific information includes any one of a vehicle number, a place of departure, a destination, and weather.

8. A translation method performed by a translation device, wherein a storage of the translation device stores a plurality of example sentences each including a parameter representing a category corresponding to a plurality of terms, the translation method comprising:

acquiring specific information that corresponds to a specific parameter and represents a specific term related to a vehicle with a passenger on board or a shop where a guest is, from a system related to the vehicle or the shop;

generating a spoken sentence in a first language by recognizing a voice;

searching the plurality of example sentences stored in the storage for an example sentence based on the spoken sentence as a search result example sentence to generate a converted sentence, based on the search result example sentence; and searching the spoken sentence, based on a search formula corresponding to the plurality of terms, and retrieving a term among the plurality of terms corresponding to the parameter, wherein, in the generating the converted sentence, when the search result example sentence includes the specific parameter, the converted sentence is generated based on the specific term represented by the specific information, and when the search result example sentence does not include the specific parameter, the parameter in the search result example sentence is replaced with a translation word, in a second language, corresponding to the term retrieved in the spoken sentence.

9. A non-transitory recording medium storing a program that causes the translation device to execute the translation method according to claim 8.

* * * * *